US012564831B2

(12) United States Patent
Akhtar et al.

(10) Patent No.: US 12,564,831 B2
(45) Date of Patent: Mar. 3, 2026

(54) CATALYST REGENERATION SYSTEM UTILIZATION FOR HEAT EXCHANGER DECOKING

(71) Applicant: Saudi Arabian Oil Company, Dhahran (SA)

(72) Inventors: Muhammad Bilal Akhtar, Ras Tanura (SA); Saud Al Saud, Ras Tanura (SA); Ali M. Al Dossary, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 105 days.

(21) Appl. No.: 18/671,391

(22) Filed: May 22, 2024

(65) Prior Publication Data

US 2025/0360500 A1     Nov. 27, 2025

(51) Int. Cl.
   B01J 38/38      (2006.01)
   B01J 8/18       (2006.01)
   F28G 11/00      (2006.01)
(52) U.S. Cl.
   CPC ................. B01J 38/38 (2013.01); B01J 8/18 (2013.01); F28G 11/00 (2013.01)
(58) Field of Classification Search
   CPC .. F28G 13/00; F28G 11/00; F28G 1/12; B01J 8/18; B01J 38/00; B01J 38/04; B01J 38/20; B01J 38/30; B01J 38/38; B01J 38/40
   See application file for complete search history.

(56) References Cited

U.S. PATENT DOCUMENTS

| | | | | |
|---|---|---|---|---|
| 3,908,628 A | * | 9/1975 | Lazaridis | F28D 7/106 |
| | | | | 432/223 |
| 6,929,015 B2 | | 8/2005 | Nastoll et al. | |
| 6,974,318 B2 | | 12/2005 | Ahn et al. | |
| 2003/0230324 A1 | | 12/2003 | Nastoll et al. | |
| 2018/0318821 A1 | * | 11/2018 | Fei | B01J 8/0025 |

FOREIGN PATENT DOCUMENTS

| | | |
|---|---|---|
| CN | 203772119 | 8/2014 |
| CN | 106011892 | 10/2016 |
| CN | 117704411 A | 3/2024 |

(Continued)

OTHER PUBLICATIONS

International Search Report and Written Opinion in International Appln. No. PCT/US2025/028137, mailed on Aug. 11, 2025, 12 pages.

(Continued)

*Primary Examiner* — Richard M Rump
(74) *Attorney, Agent, or Firm* — Fish & Richardson P.C.

(57)                ABSTRACT

A catalyst regeneration gas loop is operated in a heat exchanger decoking mode. A regeneration gas is diverted away from a burn zone of the catalyst regeneration gas loop and to a heat exchanger, where coke deposits are disposed on a surface of the heat exchanger. The regeneration gas is prevented from flowing to an oxychlorination/calcination zone of the catalyst regeneration gas loop. Within the heat exchanger, the coke deposits are combusted with oxygen of the regeneration gas, thereby removing the coke deposits from the surface of the heat exchanger and producing carbon dioxide. Oxygen is replenished to the regeneration gas. The regeneration gas is recycled to the heat exchanger.

19 Claims, 3 Drawing Sheets

(56)     References Cited

FOREIGN PATENT DOCUMENTS

| FR | 1274734 A | 10/1961 |
| JP | 2005521021 | 7/2005 |
| WO | WO 2024020143 A1 | 1/2024 |

OTHER PUBLICATIONS apfm.org [online], "AM-04-42—Cleaning Packinox Heat Exchangers in Catalytic Reforming Service," available on or before Jun. 7, 2021, via Internet Archive: Wayback Machine URL <https://web.archive.org/web/20240000000000*/https://www2.afpm.org/forms/store/ProductFormPublic/am-04-42-cleaning-packinox-heat-exchangers-in-catalytic-reforming-service>, retrieved on Sep. 12, 2024, URL <https://www2.afpm.org/forms/store/ProductFormPublic/am-04-42-cleaning-packinox-heat-exchangers-in-catalytic-reforming-service>, 1 page.
Barnes et al., "HDS benefits from plate heat exchangers," Petroleum Technology Quarterly, 2004, 9:85-92, 6 pages.

* cited by examiner

100

SWITCH OPERATION OF CATALYST REGENERATION SYSTEM
FROM CATALYST REGENERATION TO DECOKING

CLOSE FIRST FLOW PATH
_202a_

DIVERT REGENERATION GAS FROM FIRST FLOW PATH
TO SECOND FLOW PATH                    _202b_

CIRCULATE REGENERATION GAS THROUGH HEAT
EXCHANGER VIA SECOND FLOW PATH WHILE FIRST
FLOW PATH IS CLOSED                    _202c_

_202_

_200_

CATALYST REGENERATION SYSTEM UTILIZATION FOR HEAT EXCHANGER DECOKING

TECHNICAL FIELD

This disclosure relates to decoking operations, and in particular, decoking operations for heat exchangers, such as welded plate heat exchangers, vertical shell-and-tube heat exchangers, etc.

BACKGROUND

Fouling, coking, or simply "sticking" is a costly surface problem that occurs in many industrial applications. Surface fouling can cause contamination, promote corrosion, reduce process flow, increase maintenance, negatively impact heat transfer efficiency, and ultimately inflate costs while worsening performance. Some additional disadvantages of surface fouling include increase in drag (which increases pressure drop), reduce heat transfer capability, and increase in emissions. Dealing with the impacts of deposits and build-up of unwanted materials depends on the application, and the cost of implementing solutions can be costly. In various industrial processes, dealing with inefficiencies of heat transfer equipment due to fouling can be costly. Decoking is considered an efficient method for removing such deposited materials, such as coke and other carbonaceous materials. For specialized heat exchangers, such as welded plate heat exchangers and large, vertical heat exchangers (for example, Texas Towers) in which mechanical cleaning presents a big challenge, efficiently decoking of such heat exchangers can be difficult.

SUMMARY

This disclosure describes technologies relating to decoking operations for heat exchangers. The subject matter described in this disclosure can be implemented in particular implementations, so as to realize one or more of the following advantages. The described flow scheme performs the decoking operations by using nitrogen instead of steam, thereby eliminating the corrosion/integrity risks associated with the use of steam. Re-circulation of nitrogen in the proposed flow scheme requires less nitrogen in comparison to typical once-through decoking operations. In addition, utilization of existing equipment (e.g., catalyst regeneration gas loop equipment) for the decoking operations results in significant capital expenditures (CAPEX) savings. The described flow scheme can be implemented in new unit designs and in existing units (e.g., via retrofit/revamp). For example, an existing catalyst regeneration gas loop can be retrofitted with the described flow scheme to be capable of switching to a decoking process for decoking a heat exchanger. As another example, existing equipment, such as an electric heater of the catalyst regeneration gas loop, can also be used while the system is in the decoking mode for decoking the heat exchanger, instead of requiring an additional heater. As another example, in cases in which the catalyst regeneration gas loop includes a vent gas wash system, the same vent gas wash system can be used for the decoking process for washing acid gases and removing soot that may accumulate during the decoking process. As another example, the existing control system of the catalyst regeneration gas loop can be adjusted (for example, with additional control schemes) to monitor and control parameters of the decoking process. Because the decoking operations employ fluids that are already used in catalyst regeneration operations, the systems and methods described can be implemented easily and flexibly in existing and new systems. For example, the existing control system for controlled air injection used by the catalyst regeneration gas loop can also be used to perform the decoking operation for the heat exchanger. The described flow scheme can be implemented on a permanent basis, thereby reducing costs of subsequent decoking operations implemented on the heat exchanger. The described flow scheme can be especially useful in decoking welded plate-type heat exchangers and large, vertical shell-and-tube heat exchangers. In cases in which the catalyst regeneration gas loop already utilizes nitrogen in the catalyst regeneration operations, the existing equipment in the catalyst regeneration gas loop does not need to be upgraded since the existing equipment is already rated for nitrogen operation. The described flow scheme can be implemented on existing and/or new systems for performing decoking operations, which can reduce the dependency on third parties to perform such decoking operations.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes an innovative re-purposing of a flow configuration of an existing catalyst regeneration gas loop through a heat exchanger to perform decoking operations on the heat exchanger. The technology described can be especially useful on specialized heat exchangers (such as welded plate heat exchangers and large, vertical shell-and-tube heat exchangers) in which efficient decoking based on their associated arrangement may otherwise be difficult. The decoking operation involves burning off hard coke and other carbonaceous material that has been deposited on surfaces in the heat exchanger by controlled addition of air. Typical decoking operations require arrangement of high-energy equipment and auxiliaries. The proposed flow scheme allows utilization of existing equipment that is normally used in catalyst regeneration to be used in decoking operations of the heat exchanger. During decoking operations, nitrogen (which is already used in the catalyst regeneration gas loop) is circulated through the heat exchanger via an alternative flow route. The flow routes to/from burn zone(s) and oxygenation/calcination zone(s) of the catalyst regeneration gas loop are closed off, so that the nitrogen circulates and re-circulates through the heat exchanger throughout the decoking operations.

Figure 1:
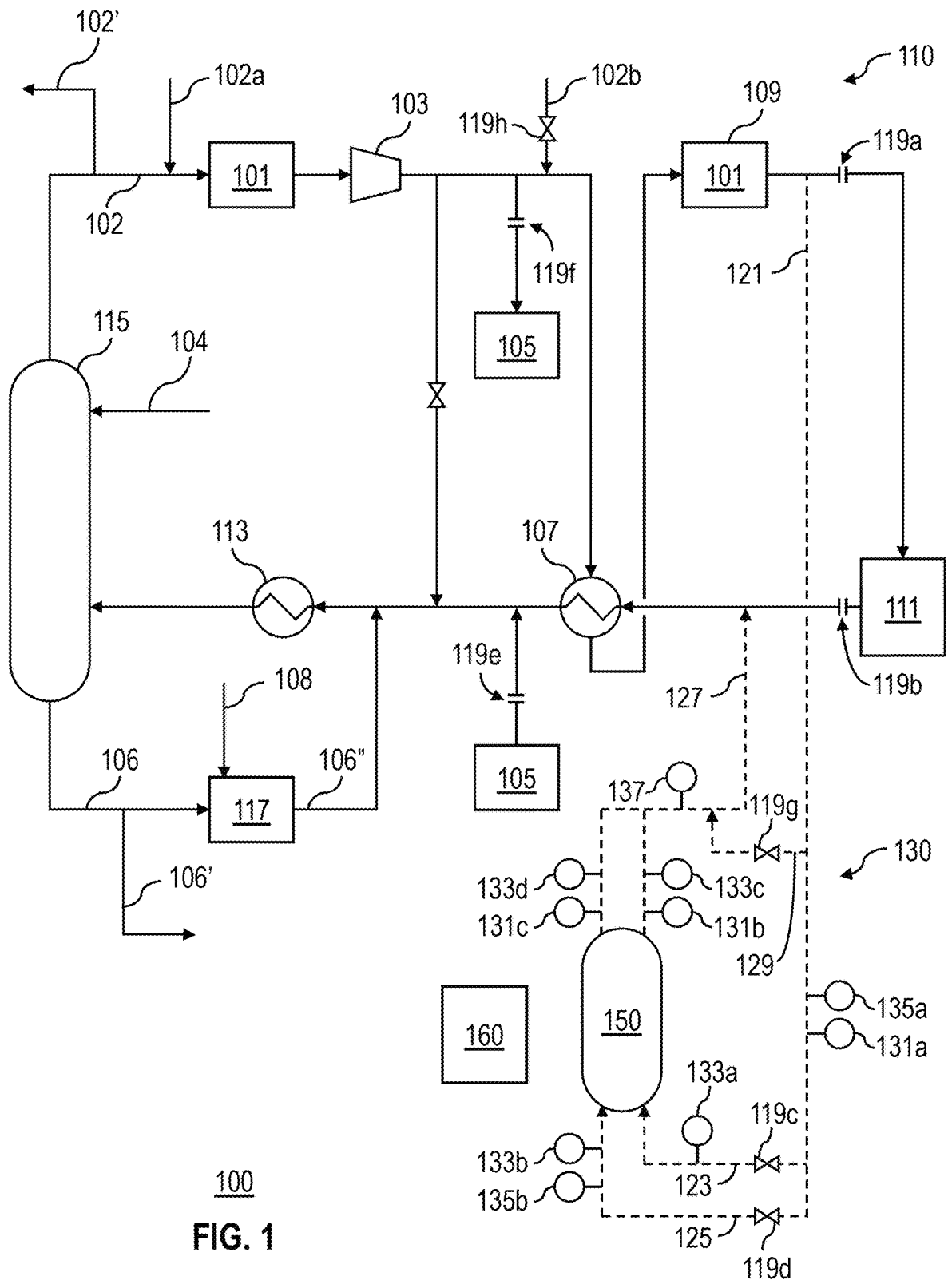
FIG. 1 is a schematic diagram of an example catalyst regeneration system that can be switched to a decoking operation for a heat exchanger in the system.

FIG. 1 depicts an example system 100 which can switch between a catalyst regeneration mode and a decoking mode for a heat exchanger 150. The system 100 includes a regeneration gas loop 110. A regeneration gas 102 circulates through the regeneration gas loop 110. The regeneration gas 102 includes nitrogen and oxygen. The regeneration gas 102 can, for example, include mainly nitrogen, while including other gases, such as oxygen and carbon dioxide. A nitrogen stream 102a can replenish the nitrogen to the regeneration gas 102. An oxygen stream 102b can replenish the oxygen to the regeneration gas 102. In the catalyst regeneration mode, the regeneration gas 102 flows through a dryer 101. The dryer 101 can dehydrate the regeneration gas 102. After flowing through the dryer 101, the regeneration gas 102 flows to a compressor 103. The compressor 103 pressurizes the regeneration gas 102, such that a discharge pressure of the regeneration gas 102 exiting the compressor 103 is greater than a suction pressure of the regeneration gas 102 entering the compressor 103. A first portion of the regeneration gas 102 branches from the regeneration gas loop 110 and flows to an oxychlorination/calcination zone 105. The oxychlorination/calcination zone 105 is configured to chlorinate and dry a catalyst using the first portion of the regeneration gas 102. In cases where the catalyst regeneration gas loop does not require oxychlorination and/or calcination for regenerating the catalyst, the oxychlorination/calcination zone 105 may be omitted. A second portion of the regeneration gas 102 flows through a first side of a heat exchanger 107. The heat exchanger 107 heats the second portion of the regeneration gas 102 as the regeneration gas 102 flows through the first side of the heat exchanger 107.

The second portion of the regeneration gas 102 exits the heat exchanger 107 and flows to a burning heater 109. The burning heater 109 heats the second portion of the regeneration gas 102 as the regeneration gas 102 flows through the burning heater 109. The burning heater 109 heats the second portion of the regeneration gas 102 in the presence of oxygen at a controlled oxygen concentration to a temperature sufficiently hot to burn off coke that has been deposited on the catalyst. In some implementations, an initial concentration of oxygen in the regeneration gas 102 is in a range of from about 0.4 molar percent (mol %) to about 0.8 mol %, which allows for controlled burning and avoids generating an exotherm in the system. The second portion of the regeneration gas 102 exits the burning heater 109 and flows to a burn zone 111. As the second portion of the regeneration gas 102 flows through the burn zone 111, the second portion of the regeneration gas 102 comes into contact with the catalyst. The oxygen 102b of the regeneration gas 102 is used in the burn zone 111 to combust the coke to burn off the coke that has been deposited on the catalyst, thereby regenerating the catalyst. The catalyst can be any catalyst in which decoking is desirable for regenerating the catalyst. For example, the catalyst can be a spherical-type catalyst used for catalytic reforming of naphtha and lighter hydrocarbons. In some implementations, the catalyst includes high-purity alumina-based spherical beads that are impregnated with precious metals, such as platinum. Because combustion has occurred in the burn zone 111, the second portion of the regeneration gas 102 exiting the burn zone 111 can have an operating temperature greater than the second portion of the regeneration gas 102 entering the burn zone 111. Additionally, the second portion of the regeneration gas 102 exiting the burn zone 111 can have a lower oxygen content and a higher carbon dioxide content in comparison to the second portion of the regeneration gas 102 entering the burn zone 111. Although shown in FIG. 1 as including a single burn zone 111, the system 100 can optionally include additional burn zones (such as two, three, four, or more than four burn zones) based on the amount of catalyst that requires regeneration.

The second portion of the regeneration gas 102 exits the burn zone 111 and flows through a second side of the heat exchanger 107. The heat exchanger 107 cools the second portion of the regeneration gas 102 as the regeneration gas 102 flows through the second side of the heat exchanger 107. Via heat integration through the heat exchanger 107, the second portion of the regeneration gas 102, in effect, transfers heat to itself. The portion of the regeneration gas 102 flowing through the second side of the heat exchanger 107 transfers heat, via the heat exchanger 107, to the portion of the regeneration gas 102 flowing through the first side of the heat exchanger 107. However, the portion of the regeneration gas 102 flowing through the first side of the heat exchanger 107 does not come into direct contact with the portion of the regeneration gas 102 flowing through the second side of the heat exchanger 107. Instead, the heat exchanger 107 provides a heat transfer area through which heat can be transferred between the fluids flowing through the first and second sides of the heat exchanger 107.

The second portion of the regeneration gas 102 exits the second side of the heat exchanger 107 and flows through a cooler 113. The first portion of the regeneration gas 102 that was previously diverted to the oxychlorination/calcination zone 105 can flow from the oxychlorination/calcination zone 105 and rejoin the second portion of the regeneration gas 102 in the regeneration gas loop 110 between the heat exchanger 107 and the cooler 113. Before entering the cooler 113, the regeneration gas 102 (combined first and second portions) can mix with a circulating caustic stream 106" to neutralize chloride that may be present in the regeneration gas 102. The cooler 113 then cools the regeneration gas 102 as the regeneration gas 102 flows through the cooler 113. The regeneration gas 102 (along with the circulating caustic stream 106") exits the cooler 113 and flows to a wash drum 115. Water 104 is sprayed near or at the top of the wash drum 115. As the regeneration gas 102 flows up the wash drum 115, the regeneration gas 102 comes into contact with droplets of the water 104 within the wash drum 115. The wash drum 115 can be sized to allow the water 104 to scrub traces of caustic from the regeneration gas 102 as the regeneration gas 102 flows up the wash drum 115. The spray of water 104 can provide cooling to the regeneration gas 102 along with absorbing pollutants from the regeneration gas 102, thereby cleaning the regeneration gas 102 exiting the wash drum 115. In some cases, a purge stream 102' branches from the regeneration gas loop 110. The purge stream 102' can, for example, be flowed to a safe venting location for relieving excess gas that may otherwise accumulate in the system 100 during the process. The nitrogen 102a supplied to the regeneration gas loop 110 can replenish the nitrogen supply to the regeneration gas 102, for example, that has been lost in the system 100 due to purging (via the purge stream 102') and other related concerns. The oxygen 102b supplied to the regeneration gas loop 110 can replenish the oxygen supply to the regeneration gas 102 that has been used to burn off the coke from the catalyst in the burn zone 111.

A liquid stream 106 exits the wash drum 115. In some cases, a purge stream 106' branches from the regeneration gas loop 110. The purge stream 106' can, for example, be processed to clean the purge stream 106', be disposed, or both. The remaining portion of the liquid stream 106 (which is the circulating caustic stream 106") can flow to a circulating caustic system 117. The caustic system 117 adds a base (such as sodium hydroxide) to maintain a caustic concentration in the circulating caustic stream 106". The circulating caustic stream 106" exiting the caustic system 117 is recycled upstream of the cooler 113 and mixed with the regeneration gas 102 to neutralize the acidic content of the regeneration gas 102. A makeup caustic stream 108 can be supplied to the caustic system 117 to replenish the base in the caustic system 117.

The system 100 can be switched from the catalyst regeneration mode to a heat exchanger decoking mode. The system 100 includes a flow control subsystem 130. The flow control subsystem 130 is associated with the decoking operation of the heat exchanger 150, and the flow lines of the flow control subsystem 130 are shown in FIG. 1 as dashed lines, simply to differentiate the flow control subsystem 130 from the existing regeneration gas loop 110. The flow control subsystem 130 includes various flow control elements (119*a*, 119*b*, 119*c*, 119*d*, 119*e*, 119*f*, and 119*g*). Each of the flow control elements can include a removable blind, a flow control valve (such as a shut-off valve or other flow control valve), or both. Although shown in FIG. 1 as including seven flow control elements, the flow control subsystem 130 can include fewer or additional flow control elements, depending on the number of burn zone(s) (111), system temperature quenching requirement(s), oxygen supply requirement(s)/strategy, and desired flow control in the system 100. In the heat exchanger decoking mode, the first flow control element 119*a* is closed. In the closed position, the first flow control element 119*a* prevents flow of fluid (such as the second portion of the regeneration gas 102) from the regeneration gas loop 110 to the burn zone 111. In the heat exchanger decoking mode, the second flow control element 119*b* is closed. In the closed position, the second flow control element 119*b* prevents flow of fluid from the burn zone 111 to the regeneration gas loop 110. Due to the first and second flow control elements 119*a*, 119*b* being in the closed position, the regeneration gas 102 is instead diverted to the heat exchanger 150 while the system 100 is in the heat exchanger decoking mode. In the heat exchanger decoking mode, the regeneration gas 102 is flowed through a first flowline 121 that branches from the regeneration gas loop 110 and connects to the heat exchanger 150. In some implementations, as shown in FIG. 1, the first flowline 121 splits into a second flowline 123 and a third flowline 125, and each of the second flowline 123 and the third flowline 125 connects to the heat exchanger 150. For example, the second flowline 123 connects to a first side (such as the hot side) of the heat exchanger 150, and the third flowline 125 connects to a second side (such as the cold side) of the heat exchanger 150. In some implementations, simply the first flowline 121 connects directly to the heat exchanger 150. In some implementations, the first flowline 121 is split into several flowlines that connect to the heat exchanger 150 (for example, flowlines 123 and 125) and/or bypass the heat exchanger 150 (for example, flowline 129). The splitting of the first flowline 121 can allow for the flow of the second portion of the regeneration gas 102 to both sides (such as the hot side and the cold side) of the heat exchanger 150 (for example, via flowlines 123 and 125) and/or bypass the heat exchanger 150 (for example, via flowline 129) as needed. The third flow control element 119*c* installed on the second flowline 123 and the fourth flow control element 119*d* installed on the third flowline 125 can control distribution and flow of the regeneration gas 102 through the second flowline 123 and the third flowline 125, respectively, into the heat exchanger 105. As the regeneration gas 102 flows through the heat exchanger 105, the oxygen 102*b* of the regeneration gas 102 is used in the heat exchanger 105 to combust the coke to burn off the coke that has been deposited on surface(s) of the heat exchanger 105 across which the regeneration gas 102 flows. The decoking process for the heat exchanger 105 while the system 100 is in the heat exchanger decoking mode may be similar to the coke burning process for the catalyst while the system 100 is in the catalyst regeneration mode. Because combustion has occurred in the heat exchanger 150, the regeneration gas 102 exiting the heat exchanger 150 can have an operating temperature greater than the regeneration gas 102 entering the heat exchanger 150. Additionally, the regeneration gas 102 exiting the heat exchanger 150 can have a lower oxygen content and a higher carbon dioxide content in comparison to the regeneration gas 102 entering the heat exchanger 150. The regeneration gas 102 exiting the heat exchanger 150 then flows through a fourth flowline 127 and rejoins the regeneration gas loop 110. The regeneration gas 102 then flows through the regeneration gas loop 110 as described previously. However, in the heat exchanger decoking mode, the fifth flow control element 119*e* and the sixth flow control element 119*f* are closed. In the closed position, the fifth flow control element 119*e* prevents flow of fluid from the oxychlorination/calcination zone 105 to the regeneration gas loop 110. In the closed position, the sixth flow control element 119*f* prevents flow of fluid from the regeneration gas loop 110 to the oxychlorination/calcination zone 105. Due to the fifth and sixth flow control elements 119*e*, 119*f* being in the closed position, the regeneration gas 102 is prevented from flowing to/from the oxychlorination/calcination zone 105 while the system 100 is in the heat exchanger decoking mode. The flow control subsystem 130 can include the seventh flow control element 119*g* installed on a bypass flowline 129 connecting the first flowline 121 and the fourth flowline 127. The seventh flow control element 119*g* can include, for example, a flow control valve that controls an amount of the regeneration gas 102 that bypasses the heat exchanger 150 instead of flowing through the heat exchanger 150. The seventh flow control element 119*g* can be used to ensure adequate flow of the second portion of the regeneration gas 102 through the burning heater 109 while the system 100 is in the heat exchanger decoking mode. For example, if the total flow of the regeneration gas 102 entering the heat exchanger 150 via flowlines 123 and 125 while the system 100 is in the heat exchanger decoking mode is less than a minimum flow requirement for safe operation of the burning heater 109, the seventh flow control element 119*g* can be adjusted to increase a percent opening of the seventh flow control element 119*g* for increasing the amount of flow of the regeneration gas 102 bypassing the heat exchanger 150, such that a total flow of the second portion of the regeneration gas 102 through the burning heater 109 remains at or above the minimum flow requirement for safe operation of the burning heater 109.

The flow control subsystem 130 can include a computer 160. The computer 160 can be configured to switch the system 100 between the catalyst regeneration mode and the heat exchanger decoking mode. The computer 160 can, for example, automate the closing/opening of the flow control elements (119*a*, 119*b*, 119*c*, 119*d*, 119*e*, 119*f*, and 119*g*) to switch between the catalyst regeneration mode and the heat exchanger decoking mode. The computer 160 can include, for example, a processor and a memory that can hold data for the computer 160, other components, or both, which can be connected to a network. The processor of the computer 160 can be communicatively coupled to the memory of the computer 160. The processor of the computer 160 can execute instructions and manipulate data to perform operations of the computer 160 and any algorithms, methods, functions, processes, flows, and procedures as described in this disclosure. The memory of the computer 160 can be a transitory or non-transitory storage medium. The memory of the computer 160 can include any number of volatile and nonvolatile memory devices, such as volatile random-access memory (RAM), static random-access memory (SRAM), flash memory, and the like. The memory of the computer 160 stores computer-readable instructions executable by the processor of the computer 160 that, when executed, cause the processor of the computer 160 to perform operations, such as adjusting percent openings of various flow control elements (for example, flow control valves) based on measurements obtained from sensors (for example, temperature sensors, pressure sensors, flowmeters, and carbon dioxide sensors).

The flow control subsystem 130 can include various temperature sensors (131a, 131b, 131c) configured to detect an operating temperature of the regeneration gas 102 being used to remove coke from the heat exchanger 150 while the system 100 is in the heat exchanger decoking mode. The first temperature sensor 131a can, for example, be installed on the first flowline 121 to detect the operating temperature of the regeneration gas 102 flowing through the first flowline 121 prior to entering the first side (for example, the hot side) of the heat exchanger 150. The second temperature sensor 131b can, for example, be installed on a first outlet of the heat exchanger 150 to detect the operating temperature of the regeneration gas 102 flowing out of the first outlet of the heat exchanger 150. The first outlet of the heat exchanger 150 can be, for example, an outlet of the first side (such as the hot side) of the heat exchanger 150. The third temperature sensor 131c can, for example, be installed on a second outlet of the heat exchanger 150 to detect the operating temperature of the regeneration gas 102 flowing out of the second outlet of the heat exchanger 150. The second outlet of the heat exchanger 150 can be, for example, an outlet of the second side (such as the cold side) of the heat exchanger 150. The temperature sensors (131a, 131b, 131c) can be communicatively coupled to the computer 160 and can transmit temperature signals to the computer 160. Although shown in FIG. 1 as including three temperature sensors, the flow control subsystem 130 can include fewer or additional temperature sensors based on the needs of the system 100.

The flow control subsystem 130 can include various pressure sensors (133a, 133b, 133c, 133d) configured to detect an operating pressure of the regeneration gas 102 being used to remove coke from the heat exchanger 150 while the system 100 is in the heat exchanger decoking mode. The first pressure sensor 133a can, for example, be installed on the second flowline 123 to detect the operating pressure of the regeneration gas 102 flowing through the second flowline 123 prior to entering the first side of the heat exchanger 150. The second pressure sensor 133b can, for example, be installed on the third flowline 125 to detect the operating pressure of the regeneration gas 102 flowing through the third flowline 125 prior to entering the second side of the heat exchanger 150. The third pressure sensor 133c can, for example, be installed on the first outlet of the heat exchanger 150 to detect the operating pressure of the regeneration gas 102 flowing out of the first outlet of the first side of the heat exchanger 150. The fourth pressure sensor 133d can, for example, be installed on the second outlet of the heat exchanger 150 to detect the operating pressure of the regeneration gas 102 flowing out of the second outlet of the second side of the heat exchanger 150. The pressure sensors (133a, 133b, 133c, 133d) can be communicatively coupled to the computer 160 and can transmit pressure signals to the computer 160. Although shown in FIG. 1 as including four pressure sensors, the flow control subsystem

130 can include fewer or additional pressure sensors based on the needs of the system 100.

The flow control subsystem 130 can include various flowmeters (135a, 135b) configured to detect a flow rate of the regeneration gas 102 being used to remove coke and other carbonaceous materials that have deposited on surface(s) of the heat exchanger 150 while the system 100 is in the heat exchanger decoking mode. The first flowmeter 135a can, for example, be installed on the first flowline 121 to detect the flow rate of the regeneration gas 102 flowing through the first flowline 121 prior to entering the heat exchanger 150. The second flowmeter 135b can, for example, be installed on the second flowline 123 to detect the flow rate of the regeneration gas 102 flowing through the second flowline 123 prior to entering the heat exchanger 150. In such cases, the flow rate of the regeneration gas 102 flowing through the third flowline 125 can be calculated to be the difference between the flow rate detected by the first flowmeter 135a and the flow rate detected by the second flowmeter 135b. In other cases, the second flowmeter 135b can be installed on the third flowline 125 to detect the flow rate of the regeneration gas 102 flowing through the third flowline 125 prior to entering the heat exchanger 150. In such cases, the flow rate of the regeneration gas 102 flowing through the second flowline 123 can be calculated to be the difference between the flow rate detected by the first flowmeter 135a and the flow rate detected by the second flowmeter 135b. The flowmeters (135a 135b) can be communicatively coupled to the computer 160 and can transmit flow signals to the computer 160. Although shown in FIG. 1 as including two flowmeters, the flow control subsystem 130 can include fewer or additional flowmeters based on the needs of the system 100.

The computer 160 can analyze the temperature measurements received from the temperature sensors (131a, 131b, 131c), the pressure measurements received from the pressure sensors (133a, 133b, 133c, 133d), and the flow measurements received from the flowmeters (135a, 135b) and adjust the percent openings of any combination of the third flow control element 119c, the fourth flow control element 119d, and the seventh flow control element 119g to control flow of the regeneration gas 102 through the heat exchanger 150 (via third and fourth flow control elements 119c, 119d) and flow of the bypass portion of the regeneration gas 102 that avoids and bypasses the heat exchanger 150 (via seventh flow control element 119g). For example, if the computer 160 determines that the temperature of the regeneration gas 102 exiting the heat exchanger 150 is approaching or has approached a maximum temperature threshold value, then the computer 160 can transmit a signal that decreases the percent opening of the eighth flow control element 119h for decreasing the oxygen concentration in the regeneration gas 102 by decreasing the flow rate of the oxygen stream 102b, decreases the percent opening of the third flow control element 119c for decreasing the flow rate of the regeneration gas 102 flowing to the hot side of the heat exchanger 150, increases the percent opening of the fourth flow control element 119d for increasing the flow rate of the regeneration gas 102 flowing to the cold side of the heat exchanger 150, and balances the flow of the regeneration gas 102 through the system 100 by adjustment of the seventh flow control element 119g (heat exchanger bypass flowline 129). Decreasing the oxygen concentration in the regeneration gas 102 by decreasing the flow rate of the oxygen stream 102b can reduce the rate of combustion within the heat exchanger 150. Decreasing the flow rate of the regeneration gas 102 to the hot side of the heat exchanger 150 while increasing the flow rate of the regeneration gas 102 to the cold side of the heat exchanger 150 can have a quenching effect on the heat exchanger 150. Once the operating temperature of the regeneration gas 102 has decreased (cooled) sufficiently, the computer 160 can transmit a signal that gradually adjusts the oxygen concentration in the regeneration gas 102 (by eighth flow control element 119h) and flow of the regeneration gas 102 through the heat exchanger 150 (by third, fourth, and seventh flow control elements 119c, 119d, 119g), so that a larger portion of the regeneration gas 102 flows through the heat exchanger 150 again to continue the decoking operation of the heat exchanger 150.

Another example includes monitoring a temperature differential for each side of the heat exchanger 150 (for example, the hot side and the cold side) between the regeneration gas 102 exiting the heat exchanger 150 and the regeneration gas 102 entering the heat exchanger 150. During the decoking operation, it can be desirable to ensure that this temperature differential does not exceed a maximum temperature differential threshold value. In some implementations, the maximum temperature differential threshold value is about 30 degrees Celsius (° C.) differential, about 31° C. differential, about 32° C. differential, about 33° C. differential, about 34° C. differential, or about 35° C. differential. The percent openings of the third flow control element 119c, the fourth flow control element 119d, the seventh flow control element 119g, and the eighth flow control element 119h (for controlling oxygen concentration in the regeneration gas 102) can be adjusted to ensure that the difference between the operating temperature of the regeneration gas 102 exiting each side of the heat exchanger 150 and the operating temperature of the regeneration gas 102 entering each side of the heat exchanger 150 remains at or below the maximum temperature differential threshold value. For example, while the system 100 is in the heat exchanger decoking mode, the difference between the operating temperature of the regeneration gas 102 exiting the first side (for example, hot side) of the heat exchanger 150 and the operating temperature of the regeneration gas 102 entering the first side of the heat exchanger 150 is in a range of from 0° C. differential to about 35° C. differential. For example, while the system 100 is in the heat exchanger decoking mode, the difference between the operating temperature of the regeneration gas 102 exiting the second side (for example, cold side) of the heat exchanger 150 and the operating temperature of the regeneration gas 102 entering the second side of the heat exchanger 150 is in a range of from 0° C. differential to about 35° C. differential.

The flow control subsystem 130 can include a carbon dioxide sensor 137 configured to detect a level of carbon dioxide of the regeneration gas 102 being used to remove coke from the heat exchanger 150 while the system 100 is in the heat exchanger decoking mode. The carbon dioxide sensor 137 can, for example, be installed on the fourth flowline 127 to detect a carbon dioxide content of the regeneration gas 102 flowing through the fourth flowline 127 after the regeneration gas 102 has exited the heat exchanger 150. The carbon dioxide sensor 137 can be communicatively coupled to the computer 160 and can transmit carbon dioxide level signals to the computer 160. Although shown in FIG. 1 as including one carbon dioxide sensor, the flow control subsystem 130 can include additional carbon dioxide sensors based on the needs of the system 100. Alternatively or in addition to the carbon dioxide sensor 137, the flow control subsystem 130 can include a gas sampling subsystem for manually monitoring the level of carbon dioxide of the regeneration gas 102 while the system 100 is in the heat exchanger decoking mode.

The computer 160 can analyze the carbon dioxide level measurements received from the carbon dioxide sensor 137 to determine whether sufficient coke has been removed from the surface(s) of the heat exchanger 150. Increase in carbon dioxide content in the regeneration gas 102 can indicate that coke is still being combusted and removed from the heat exchanger 150 and that the decoking operation should continue. Stagnation (that is, stabilization at a substantially constant level) the carbon dioxide content in the regeneration gas 102 can indicate that substantially all of the coke has been combusted and removed from the heat exchanger 150 and that the decoking operation can terminate. In some implementations, after detecting stagnation of the level of carbon dioxide in the regeneration gas 102 exiting the heat exchanger 150, the heat exchanger 150 is maintained at a specified operating temperature, and the oxygen content of the regeneration gas 102 is increased to specified oxygen content for a specified time duration to ensure that all of the coke has been removed from the surface(s) of the heat exchanger 150. In some implementations, the specified operating temperature at which the heat exchanger 150 is maintained at this stage is about 450 degrees Celsius (° C.) or a maximum design temperature of the heat exchanger 150, whichever is lower. In some implementations, the specified oxygen content of the regeneration gas 102 at this stage is equal to or less than about 2 volume percent (vol. %). In some implementations, the specified time duration at this stage is in a range of from about 6 hours to about 18 hours (for example, about 12 hours).

Figure 2:
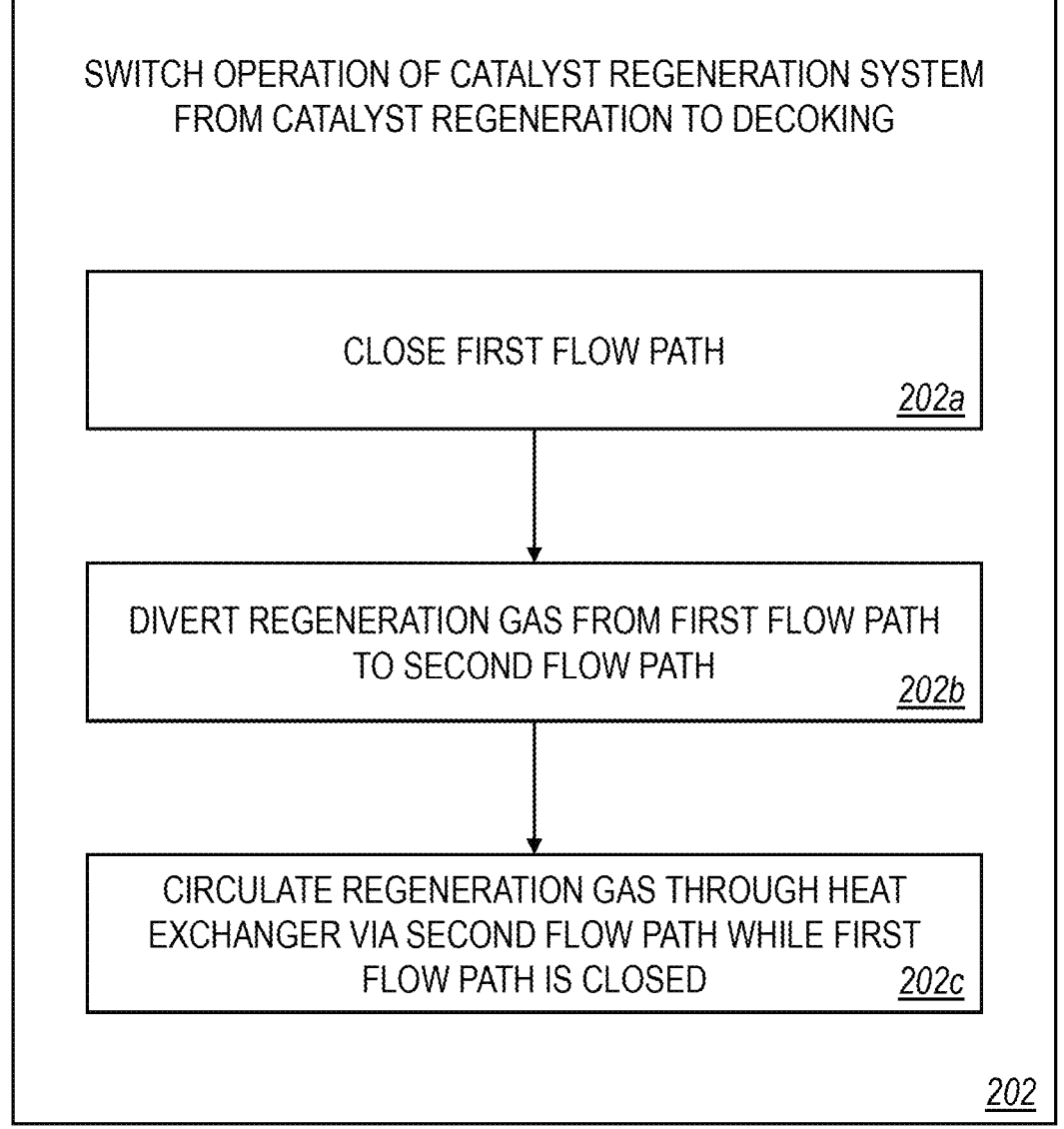
FIG. 2 is a flow chart of an example method for decoking a heat exchanger.

FIG. 2 is a flow chart of a method 200 for decoking a heat exchanger (such as the heat exchanger 150). The system 100 can, for example, implement the method 200. At block 202, operation of a catalyst regeneration system (such as the system 100) is switched from a catalyst regeneration operation (such as the catalyst regeneration mode) to a decoking operation (such as the heat exchanger decoking mode). Switching the system 100 from the catalyst regeneration mode to the heat exchanger decoking mode at block 202 includes closing a first flow path of a regeneration gas (such as the regeneration gas 102) of the system 100 at block 202a. The first flow path closed at block 202a can be the flowline that directs the regeneration gas 102 to the burn zone 111 when the system 100 is in the catalyst regeneration mode. The first flow path can be closed at block 202a by switching the first flow control element 119a to a closed position. Switching the first flow control element 119a to the closed position at block 202a can include, for example, inserting a blind, closing a control valve, or both. Switching the system 100 from the catalyst regeneration mode to the heat exchanger decoking mode at block 202 can include closing the flowline that directs fluid from the burn zone 111 to the regeneration gas loop 110. The flowline that directs fluid from the burn zone 111 to the regeneration gas loop 110 can be closed by switching the second flow control element 119b to a closed position. Switching the second flow control element 119b to the closed position can include, for example, inserting a blind, closing a control valve, or both. Switching the system 100 from the catalyst regeneration mode to the heat exchanger decoking mode at block 202 can include closing the flowline that directs fluid from the oxychlorination/calcination zone 105 to the regeneration gas loop 110. The flowline that directs fluid from the oxychlorination/calcination zone 105 to the regeneration gas loop 110 can be closed by switching the fifth flow control element 119e to a closed position. Switching the fifth flow control element 119e to the closed position can include, for example, inserting a blind, closing a control valve, or both. Switching the system 100 from the catalyst regeneration mode to the heat exchanger decoking mode at block 202 can include closing the flowline that directs fluid from the regeneration gas loop 110 to the oxychlorination/calcination zone 105. The flowline that directs fluid from the regeneration gas loop 110 to the oxychlorination/calcination zone 105 can be closed by switching the sixth flow control element 119f to a closed position. Switching the sixth flow control element 119f to the closed position can include, for example, inserting a blind, closing a control valve, or both. At block 202b, the regeneration gas 102 is diverted from the first flow path to a second flow path (such as the first flowline 121) that is coupled to the heat exchanger 150. At block 202c, the regeneration gas 102 is circulated through the heat exchanger 150 while the flow path to the burn zone 111 is closed to remove coke from the heat exchanger 150. Circulating the regeneration gas 102 through the heat exchanger 150 at block 202c can include controlling the flow of the regeneration gas 102 through the heat exchanger 150. The flow of the regeneration gas 102 through the heat exchanger 150 can be controlled, for example, by adjusting the percent opening of any combination of the third flow control element 119c, the fourth flow control element 119d, and the seventh flow control element 119g. The percent openings of the third flow control element 119c, the fourth flow control element 119d, and the seventh flow control element 119g can be adjusted based on various parameters, such as operating temperature (for example, detected by temperature sensors 131a, 131b, 131c), operating pressure (for example, detected by pressure sensors 133a, 133b, 133c, 133d), flow rate (for example, detected by flowmeters 135a, 135b), or any combinations of these.

Figure 3:
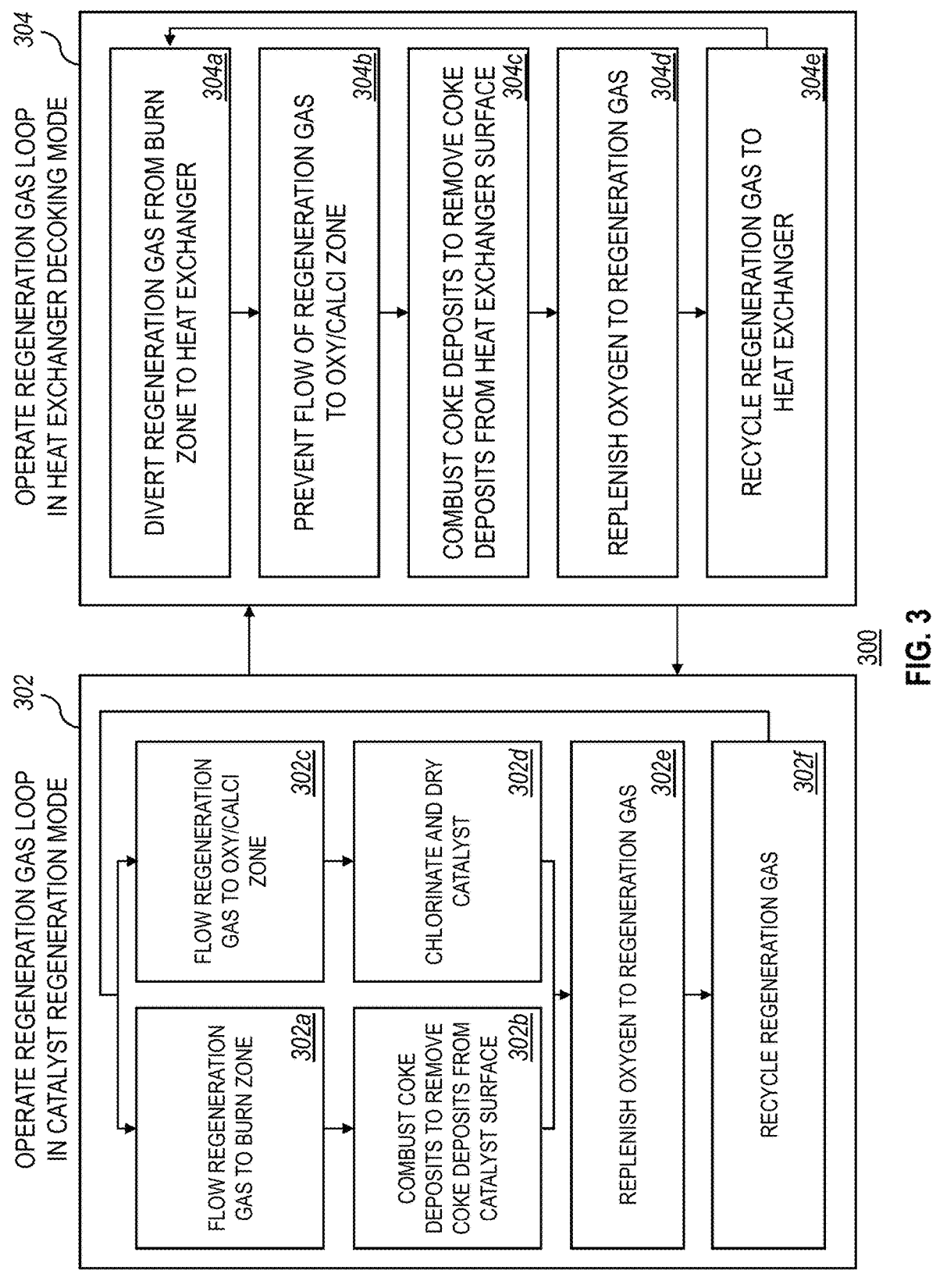
FIG. 3 is a flow chart of an example method for decoking a heat exchanger.

FIG. 3 is a flow chart of a method 300 for decoking a heat exchanger (such as the heat exchanger 150). The system 100 can, for example, implement the method 300. At block 302, a regeneration gas loop (such as the regeneration gas loop 110) is operated in a catalyst regeneration mode. Operating the regeneration gas loop 110 in the catalyst regeneration mode at block 302 includes blocks 302a, 302b, 302c, 302d, 302e, and 302f. At block 302a, a regeneration gas (such as the regeneration gas 102) flows to a burn zone (such as the burn zone 111 or multiple burn zones in series). The burn zone 111 includes a catalyst with coke deposits disposed on a surface of the catalyst. At block 302b, the coke deposits are combusted within the burn zone 111 with the oxygen of the regeneration gas 102, thereby removing the coke deposits from the surface of the catalyst and producing carbon dioxide. At block 302c, the regeneration gas flows to an oxychlorination/calcination zone (such as the oxychlorination/calcination zone 105) which includes the catalyst received from the burn zone 111. At block 302d, the catalyst is chlorinated and dried (e.g., calcinated) within the oxychlorination/calcination zone 105 with the regeneration gas 102, thereby regenerating the catalyst. At block 302e, oxygen (such as oxygen 102b) is replenished to the regeneration gas 102. At block 302f, the regeneration gas 102 is recycled. For example, at least a portion of the regeneration gas 102 is recycled to the burn zone 111 (block 302a). For example, at least a portion of the regeneration gas 102 is recycled to the oxychlorination/calcination zone 105 (block 302c). The regeneration gas loop 110 can continue to operate in the catalyst regeneration mode at block 302 continuously or intermittently, as required. One of more blocks of block 302 can be implemented in parallel (simultaneously). For example, blocks 302a and 302c can occur simultaneously.

For example, blocks 302b and 302d can occur simultaneously. At block 304, the regeneration gas loop 110 is operated in a heat exchanger decoking mode. Operating the regeneration gas loop 110 in the heat exchanger decoking mode at block 304 includes blocks 304a, 304b, 304c, 304d, and 304e. At block 304a, the regeneration gas 102 is diverted away from the burn zone 111 and to a heat exchanger (such as the heat exchanger 150). The heat exchanger 150 includes coke deposits disposed on a surface of the heat exchanger 150. At block 304b, the regeneration gas 102 is prevented from flowing to the oxychlorination/calcination zone 105. At block 304c, the coke deposits are combusted within the heat exchanger 150 with the oxygen of the regeneration gas 102, thereby removing the coke deposits from the surface of the heat exchanger 150 and producing carbon dioxide. At block 304d, oxygen 102b is replenished to the regeneration gas 102. At block 304e, the regeneration gas 102 is recycled to the heat exchanger 150. The regeneration gas loop 110 can continue to operate in the heat exchanger decoking mode at block 304 until the surface of the heat exchanger 150 is substantially free of coke deposits. One of more blocks of block 304 can be implemented in parallel (simultaneously). For example, blocks 304a and 304b can occur simultaneously. The method 300 can then repeat block 302.

Embodiments

In an example implementation (or aspect), a method comprises operating a catalyst regeneration gas loop in a heat exchanger decoking mode, wherein operating the catalyst regeneration gas loop in the heat exchanger decoking mode comprises: diverting a regeneration gas away from a burn zone of the catalyst regeneration gas loop and to a heat exchanger, wherein coke deposits are disposed on a surface of the heat exchanger, wherein the regeneration gas comprises oxygen; preventing flow of the regeneration gas to an oxychlorination/calcination zone of the catalyst regeneration gas loop; combusting, within the heat exchanger, the coke deposits with the oxygen of the regeneration gas, thereby removing the coke deposits from the surface of the heat exchanger and producing carbon dioxide; replenishing oxygen to the regeneration gas; and recycling the regeneration gas to the heat exchanger.

In an example implementation (or aspect) combinable with any other example implementation (or aspect), the method comprises detecting stagnation of a level of carbon dioxide in the regeneration gas exiting the heat exchanger.

In an example implementation (or aspect) combinable with any other example implementation (or aspect), the method comprises determining that sufficient coke has been removed from the heat exchanger based on detecting stagnation of the level of carbon dioxide in the regeneration gas exiting the heat exchanger.

In an example implementation (or aspect) combinable with any other example implementation (or aspect), the method comprises maintaining, for about 12 hours, the heat exchanger at an operating temperature that is the lower of a maximum design temperature of the heat exchanger or about 450 degrees Celsius (° C.) and the regeneration gas at a non-zero oxygen content of at most about 2 volume percent (vol. %) after detecting stagnation of the level of carbon dioxide in the regeneration gas exiting the heat exchanger.

In an example implementation (or aspect) combinable with any other example implementation (or aspect), the method comprises, after maintaining the heat exchanger at the operating temperature that is the lower of a maximum design temperature of the heat exchanger or about 450 (° C.) and the regeneration gas at the oxygen content of at most about 2 vol. %, switching the regeneration gas loop from the heat exchanger decoking mode to a catalyst regeneration mode.

In an example implementation (or aspect) combinable with any other example implementation (or aspect), switching the regeneration gas loop from the heat exchanger decoking mode to the catalyst regeneration mode comprises preventing the regeneration gas from flowing through the heat exchanger.

In an example implementation (or aspect) combinable with any other example implementation (or aspect), switching the regeneration gas loop from the heat exchanger decoking mode to the catalyst regeneration mode comprises allowing the regeneration gas to flow to and from the burn zone.

In an example implementation (or aspect) combinable with any other example implementation (or aspect), switching the regeneration gas loop from the heat exchanger decoking mode to the catalyst regeneration mode comprises allowing the regeneration gas to flow to and from the oxychlorination/calcination zone.

In an example implementation (or aspect) combinable with any other example implementation (or aspect), the regeneration gas is circulated through the heat exchanger, such that a difference between an outlet temperature of the regeneration gas exiting the heat exchanger and an inlet temperature of the regeneration gas entering the heat exchanger is non-zero and less than about 35 degrees Celsius (° C.) differential while coke is being removed from the heat exchanger.

In an example implementation (or aspect) combinable with any other example implementation (or aspect), the method comprises flowing the regeneration gas through a heater after replenishing oxygen to the regeneration gas and before recycling the regeneration gas to the heat exchanger.

In an example implementation (or aspect) combinable with any other example implementation (or aspect), the method comprises diverting at least a portion of the regeneration gas to bypass the heat exchanger, such that a total flow rate of the regeneration gas flowing through the heater is maintained above a minimum flow requirement of the heater.

In an example implementation (or aspect), a method for decoking a heat exchanger comprises switching operation of a catalyst regeneration system from a catalyst regeneration operation to a decoking operation, wherein switching operation of the catalyst regeneration system from the catalyst regeneration operation to the decoking operation comprises: closing a first flow path of a regeneration gas of the catalyst regeneration system, wherein the regeneration gas comprises oxygen; diverting the regeneration gas from the first flow path to a second flow path coupled to the heat exchanger; and circulating the regeneration gas through the heat exchanger via the second flow path while the first flow path is closed to remove coke from the heat exchanger.

In an example implementation (or aspect) combinable with any other example implementation (or aspect), the method comprises switching operation of the catalyst regeneration system from the decoking operation to the catalyst regeneration operation.

In an example implementation (or aspect) combinable with any other example implementation (or aspect), switching operation of the catalyst regeneration system from the decoking operation to the catalyst regeneration operation comprises opening the first flow path.

In an example implementation (or aspect) combinable with any other example implementation (or aspect), switching operation of the catalyst regeneration system from the decoking operation to the catalyst regeneration operation comprises closing the second flow path.

In an example implementation (or aspect) combinable with any other example implementation (or aspect), the first flow path, while the catalyst regeneration system is in the catalyst regeneration operation, directs flow of the regeneration gas to a burn zone configured to burn off coke from a catalyst using the regeneration gas.

In an example implementation (or aspect) combinable with any other example implementation (or aspect), switching operation the catalyst regeneration system from the catalyst regeneration operation to the decoking operation comprises closing a third flow path of the regeneration gas, wherein the third flow path, while the catalyst regeneration system is in the catalyst regeneration operations, directs flow of the regeneration gas to an oxychlorination/calcination zone configured to chlorinate and dry the catalyst from the burn zone using the regeneration gas, wherein switching operation of the catalyst regeneration system from the decoking operation to the catalyst regeneration operation comprises opening the third flow path.

In an example implementation (or aspect) combinable with any other example implementation (or aspect), switching operation the catalyst regeneration system from the catalyst regeneration operation to the decoking operation comprises closing a fourth flow path of the regeneration gas, wherein the fourth flow path, while the catalyst regeneration system is in the catalyst regeneration operations, receives flow of the regeneration gas from the oxychlorination/calcination zone, wherein switching operation of the catalyst regeneration system from the decoking operation to the catalyst regeneration operation comprises opening the fourth flow path.

In an example implementation (or aspect) combinable with any other example implementation (or aspect), the method comprises detecting stagnation of a level of carbon dioxide in the regeneration gas exiting the heat exchanger.

In an example implementation (or aspect) combinable with any other example implementation (or aspect), the method comprises determining that sufficient coke has been removed from the heat exchanger based on detecting stagnation of the level of carbon dioxide in the regeneration gas exiting the heat exchanger.

In an example implementation (or aspect) combinable with any other example implementation (or aspect), the method comprises maintaining, for about 12 hours, the heat exchanger at an operating temperature that is the lower of a maximum design temperature of the heat exchanger or about 450 degrees Celsius (° C.) and the regeneration gas at a non-zero oxygen content of at most about 2 volume percent (vol. %) after detecting stagnation of the level of carbon dioxide in the regeneration gas exiting the heat exchanger.

In an example implementation (or aspect) combinable with any other example implementation (or aspect), the regeneration gas is circulated through the heat exchanger via the second flow path while the first flow path is closed, such that a difference between an outlet temperature of the regeneration gas exiting the heat exchanger and an inlet temperature of the regeneration gas entering the heat exchanger is non-zero and less than about 35 degrees Celsius (° C.) differential while coke is being removed from the heat exchanger.

In an example implementation (or aspect) combinable with any other example implementation (or aspect), the method comprises flowing the regeneration gas through a heater before diverting the regeneration gas to the heat exchanger.

In an example implementation (or aspect) combinable with any other example implementation (or aspect), the method comprises diverting at least a portion of the regeneration gas to bypass the heat exchanger, such that a total flow rate of the regeneration gas flowing through the heater is maintained above a minimum flow requirement of the heater.

In an example implementation (or aspect), a system comprises: a catalyst regeneration loop comprising: a regeneration gas comprising nitrogen and oxygen; a burn zone configured to burn off coke from a catalyst using the regeneration gas; and an oxychlorination/calcination zone configured to chlorinate and dry the catalyst from the burn zone using the regeneration gas; a heat exchanger comprising an inlet and an outlet; a first flowline branching from the catalyst regeneration loop upstream of the burn zone and connecting to the inlet of the heat exchanger; a second flowline connecting the outlet of the heat exchanger to the catalyst regeneration loop downstream of the burn zone; and a flow subsystem comprising: a first flow element configured to control flow of the regeneration gas to the burn zone; a second flow element configured to control flow of the regeneration gas from the oxychlorination/calcination zone; a third flow element configured to control flow of the regeneration gas to the oxychlorination/calcination zone; and a fourth flow element configured to control flow of the regeneration gas through the heat exchanger via the first and second flowline, wherein: in a first operating mode: the flow subsystem is configured to divert flow of the regeneration gas from the catalyst regeneration loop to circulate through the heat exchanger by preventing, by the first flow element, flow of the regeneration gas to the burn zone, preventing, by the second flow element, flow of the regeneration gas from the oxychlorination/calcination zone, preventing, by the third flow element, flow of the regeneration gas to the oxychlorination/calcination zone, and allowing, by the fourth flow element, flow of the regeneration gas through the heat exchanger; and in a second operating mode: the flow subsystem is configured to circulate flow of the regeneration gas through the catalyst regeneration loop while prevent flow of the regeneration gas through the heat exchanger by allowing, by the first flow element, flow of the regeneration gas to the burn zone, allowing, by the second flow element, flow of the regeneration gas from the oxychlorination/ calcination zone, allowing, by the third flow element, flow of the regeneration gas to the oxychlorination/calcination zone, and preventing, by the fourth flow element, flow of the regeneration gas through the heat exchanger.

In an example implementation (or aspect) combinable with any other example implementation (or aspect), the flow subsystem comprises a carbon dioxide sensor configured to detect a level of carbon dioxide of the regeneration gas exiting the heat exchanger.

In an example implementation (or aspect) combinable with any other example implementation (or aspect), the flow subsystem is configured to switch from the second operating mode to the first operating mode in response to detecting that the level of carbon dioxide of the regeneration gas exiting the heat exchanger has stagnated.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "of" is used to refer to a nonexclusive "of" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:

operating a catalyst regeneration gas loop in a heat exchanger decoking mode, wherein operating the catalyst regeneration gas loop in the heat exchanger decoking mode comprises:

diverting a regeneration gas away from a burn zone of the catalyst regeneration gas loop and to a heat exchanger, wherein coke deposits are disposed on a surface of the heat exchanger, wherein the regeneration gas comprises oxygen;

preventing flow of the regeneration gas to an oxychlorination/calcination zone of the catalyst regeneration gas loop;

combusting, within the heat exchanger, the coke deposits with the oxygen of the regeneration gas, thereby removing the coke deposits from the surface of the heat exchanger and producing carbon dioxide;

replenishing oxygen to the regeneration gas; and recycling the regeneration gas to the heat exchanger.

2. The method of claim 1, comprising:

detecting stagnation of a level of carbon dioxide in the regeneration gas exiting the heat exchanger; and determining that sufficient coke has been removed from the heat exchanger based on detecting stagnation of the level of carbon dioxide in the regeneration gas exiting the heat exchanger.

3. The method of claim 2, comprising maintaining, for about 12 hours, the heat exchanger at an operating temperature that is the lower of a maximum design temperature of the heat exchanger or about 450 degrees Celsius (° C.) and the regeneration gas at a non-zero oxygen content of at most about 2 volume percent (vol. %) after detecting stagnation of the level of carbon dioxide in the regeneration gas exiting the heat exchanger.

4. The method of claim 3, comprising, after maintaining the heat exchanger at the operating temperature that is the lower of a maximum design temperature of the heat exchanger or about 450 (° C.) and the regeneration gas at the oxygen content of at most about 2 vol. %, switching the regeneration gas loop from the heat exchanger decoking mode to a catalyst regeneration mode.

5. The method of claim 4, wherein switching the regeneration gas loop from the heat exchanger decoking mode to the catalyst regeneration mode comprises:

preventing the regeneration gas from flowing through the heat exchanger;

allowing the regeneration gas to flow to and from the burn zone; and allowing the regeneration gas to flow to and from the oxychlorination/calcination zone.

6. The method of claim 1, wherein the regeneration gas is circulated through the heat exchanger, such that a difference between an outlet temperature of the regeneration gas exiting the heat exchanger and an inlet temperature of the regeneration gas entering the heat exchanger is non-zero and less than about 35 degrees Celsius (° C.) differential while coke is being removed from the heat exchanger.

7. The method of claim 1, comprising:

flowing the regeneration gas through a heater after replenishing oxygen to the regeneration gas and before recycling the regeneration gas to the heat exchanger; and

diverting at least a portion of the regeneration gas to bypass the heat exchanger, such that a total flow rate of the regeneration gas flowing through the heater is maintained above a minimum flow requirement of the heater.

8. A method for decoking a heat exchanger, the method comprising:

switching operation of a catalyst regeneration system from a catalyst regeneration operation to a decoking operation, wherein switching operation of the catalyst regeneration system from the catalyst regeneration operation to the decoking operation comprises:

closing a first flow path of a regeneration gas of the catalyst regeneration system, wherein the regeneration gas comprises oxygen;

diverting the regeneration gas from the first flow path to a second flow path coupled to the heat exchanger; and circulating the regeneration gas through the heat exchanger via the second flow path while the first flow path is closed to remove coke from the heat exchanger.

9. The method of claim 8, comprising switching operation of the catalyst regeneration system from the decoking operation to the catalyst regeneration operation, wherein switching operation of the catalyst regeneration system from the decoking operation to the catalyst regeneration operation comprises:

opening the first flow path; and closing the second flow path.

10. The method of claim 8, wherein the first flow path, while the catalyst regeneration system is in the catalyst regeneration operation, directs flow of the regeneration gas to a burn zone configured to burn off coke from a catalyst using the regeneration gas.

11. The method of claim 8, wherein switching operation the catalyst regeneration system from the catalyst regeneration operation to the decoking operation comprises closing a third flow path of the regeneration gas, wherein the third flow path, while the catalyst regeneration system is in the catalyst regeneration operations, directs flow of the regeneration gas to an oxychlorination/calcination zone configured to chlorinate and dry the catalyst from the burn zone using the regeneration gas, wherein switching operation of the catalyst regeneration system from the decoking operation to the catalyst regeneration operation comprises opening the third flow path.

12. The method of claim 11, wherein switching operation the catalyst regeneration system from the catalyst regeneration operation to the decoking operation comprises closing a fourth flow path of the regeneration gas, wherein the fourth flow path, while the catalyst regeneration system is in the catalyst regeneration operations, receives flow of the regeneration gas from the oxychlorination/calcination zone, wherein switching operation of the catalyst regeneration system from the decoking operation to the catalyst regeneration operation comprises opening the fourth flow path.

13. The method of claim 8, comprising:

detecting stagnation of a level of carbon dioxide in the regeneration gas exiting the heat exchanger; and determining that sufficient coke has been removed from the heat exchanger based on detecting stagnation of the level of carbon dioxide in the regeneration gas exiting the heat exchanger.

14. The method of claim 13, comprising maintaining, for about 12 hours, the heat exchanger at an operating temperature that is the lower of a maximum design temperature of the heat exchanger or about 450 degrees Celsius (° C.) and the regeneration gas at a non-zero oxygen content of at most about 2 volume percent (vol. %) after detecting stagnation of the level of carbon dioxide in the regeneration gas exiting the heat exchanger.

15. The method of claim 8, wherein the regeneration gas is circulated through the heat exchanger via the second flow path while the first flow path is closed, such that a difference between an outlet temperature of the regeneration gas exiting the heat exchanger and an inlet temperature of the regeneration gas entering the heat exchanger is non-zero and less than about 35 degrees Celsius (° C.) differential while coke is being removed from the heat exchanger.

16. The method of claim 8, comprising:

flowing the regeneration gas through a heater before diverting the regeneration gas to the heat exchanger; and diverting at least a portion of the regeneration gas to bypass the heat exchanger, such that a total flow rate of the regeneration gas flowing through the heater is maintained above a minimum flow requirement of the heater.

17. A system comprising:

a catalyst regeneration loop comprising:

a regeneration gas comprising nitrogen and oxygen;

a burn zone configured to burn off coke from a catalyst using the regeneration gas; and an oxychlorination/calcination zone configured to chlorinate and dry the catalyst from the burn zone using the regeneration gas;

a heat exchanger comprising an inlet and an outlet;

a first flowline branching from the catalyst regeneration loop upstream of the burn zone and connecting to the inlet of the heat exchanger;

a second flowline connecting the outlet of the heat exchanger to the catalyst regeneration loop downstream of the burn zone; and a flow subsystem comprising:

a first flow element configured to control flow of the regeneration gas to the burn zone;

a second flow element configured to control flow of the regeneration gas from the oxychlorination/calcination zone;

a third flow element configured to control flow of the regeneration gas to the oxychlorination/calcination zone; and a fourth flow element configured to control flow of the regeneration gas through the heat exchanger via the first and second flowline, wherein:

in a first operating mode:

the flow subsystem is configured to divert flow of the regeneration gas from the catalyst regeneration loop to circulate through the heat exchanger by preventing, by the first flow element, flow of the regeneration gas to the burn zone, preventing, by the second flow element, flow of the regeneration gas from the oxychlorination/calcination zone, preventing, by the third flow element, flow of the regeneration gas to the oxychlorination/calcination zone, and allowing, by the fourth flow element, flow of the regeneration gas through the heat exchanger; and in a second operating mode:

the flow subsystem is configured to circulate flow of the regeneration gas through the catalyst regeneration loop while prevent flow of the regeneration gas through the heat exchanger by allowing, by the first flow element, flow of the regeneration gas to the burn zone, allowing, by the second flow element, flow of the regeneration gas from the oxychlorination/calcination zone, allowing, by the third flow element, flow of the regeneration gas to the oxychlorination/calcination zone, and preventing, by the fourth flow element, flow of the regeneration gas through the heat exchanger.

18. The system of claim 17, wherein the flow subsystem comprises a carbon dioxide sensor configured to detect a level of carbon dioxide of the regeneration gas exiting the heat exchanger.

19. The system of claim 18, wherein the flow subsystem is configured to switch from the second operating mode to the first operating mode in response to detecting that the level of carbon dioxide of the regeneration gas exiting the heat exchanger has stagnated.

* * * * *